United States Patent [19]

Hesler et al.

[11] 4,013,936

[45] Mar. 22, 1977

[54] REGULATED HIGH VOLTAGE D.C. SUPPLY UTILIZING A PLURALITY OF D.C. TO D.C. CONVERTER MODULES

[75] Inventors: Joseph P. Hesler, Liverpool; Samuel M. Korzekwa, Baldwinsville, both of N.Y.

[73] Assignee: General Electric Company, Syracuse, N.Y.

[22] Filed: Nov. 12, 1975

[21] Appl. No.: 630,967

[52] U.S. Cl. .................................. 321/2; 250/401; 307/82; 321/18; 321/27 R
[51] Int. Cl.² ...................................... H02M 3/335
[58] Field of Search ............. 250/401, 406; 307/58, 307/82; 315/106; 321/2, 9 A, 18, 27 R

[56] References Cited
UNITED STATES PATENTS

| | | | |
|---|---|---|---|
| 3,205,425 | 9/1965 | Moyer | 321/18 |
| 3,619,758 | 11/1971 | Deranian | 321/27 R X |
| 3,746,967 | 7/1973 | Koltuniak et al. | 321/27 R X |
| 3,818,307 | 6/1974 | Hamilton et al. | 307/82 X |
| 3,914,680 | 10/1975 | Hesler et al. | 321/18 |

Primary Examiner—William M. Shoop
Attorney, Agent, or Firm—Richard V. Lang; Carl W. Baker; Frank L. Neuhauser

[57] ABSTRACT

The present invention relates to a regulated high voltage d.c. supply having an output voltage in the range of from 50 to 150 kilovolts such as is required for medical X-ray apparatus. The high voltage d.c. supply is constituted of a plurality of lower voltage d.c. to d.c. converter modules, whose output voltages are summed to produce the high voltage output. The converters are of a type which permits rapid activation and inactivation or "modulation". The modules are subjected to dynamic control to eliminate a.c. ripple, to regulate the high voltage output against supply line and load variations, and to turn the high voltage on and off in accurately timed intervals.

10 Claims, 10 Drawing Figures

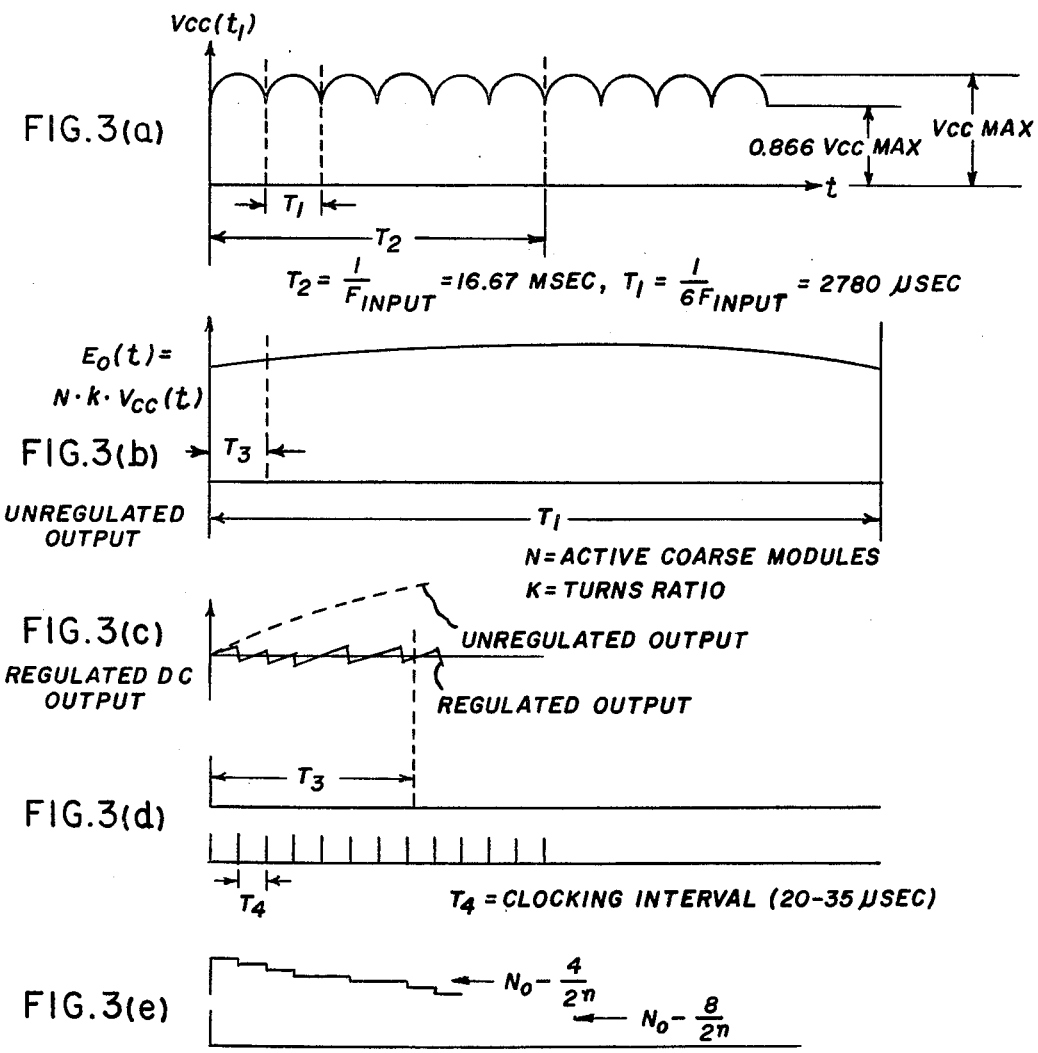
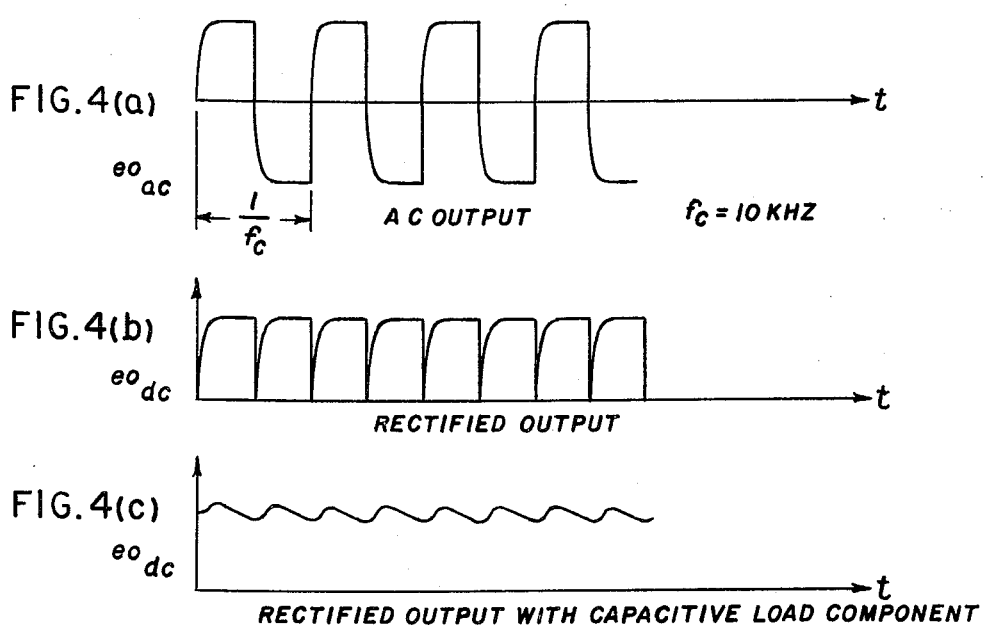

REGULATED HIGH VOLTAGE D.C. SUPPLY UTILIZING A PLURALITY OF D.C. TO D.C. CONVERTER MODULES

D.C. to D.C. converter modules suitable for use in the present high voltage supply are treated in U.S. Pat. No. 3,914,680, filed Jan. 17, 1975 on behalf of Joseph P. Hesler and Samuel M. Korzekwa, and entitled "Static Inverter", and in U.S. Pat. No. 4,002,999, filed Nov. 3, 1975, on behalf of the same inventors, and also entitled "Static Inverter".

BACKGROUND OF THE INVENTION

1. Field of the Invention

The present invention relates to high voltage d.c. supplies in which it is desired to regulate the output voltage to avoid the effects of supply line or load variations. The invention also relates to supplies in which active regulation is used to eliminate a ripple.

2. Description of the Prior Art

Present high voltage generators for X-ray applications typically use an "open loop" primary a.c. voltage control to establish the magnitude of the generated high voltage. In a similar open loop manner, the X-ray emission quantity is established by pre-setting the filament power applied to the X-ray tube filaments. The X-ray tube is operated in an emission limited mode. The duration of the X-ray exposure is controlled via neutral switches on the primary of a three-phase high voltage transformer.

This approach is sometimes augmented by using a triode X-ray tube to gate the anode current and thus the X-ray emission. The triode X-ray tubes are much more expensive and less reliable than the standard diode X-ray tubes. Another approach that has been used, is to insert high voltage tetrode vacuum tubes in series with the high voltage connections between the high voltage generator and the X-ray tube. The purpose of these approaches is to provide a faster control for the X-ray emission than can be provided via the primary neutral switching scheme.

The open loop control of the high voltage generation requires a substantial amount of additional equipment for a.c. voltage regulation. For example, a tapped three phase line transformer is supplied to pre-condition the line voltage. The final adjustment of the generated high voltage is achieved by means of a motor driven three phase variac that sets the primary a.c. voltage on the high voltage transformer.

In addition, the design of the high voltage transformer in conventional X-ray apparatus requires a roughly cubic or cylindrical shape (of significant bulk) for efficient utilization of core material and minimization of core losses. The bulk and shape factor has tended to restrict the mobility of the apparatus, and flexibility in mechanical design.

SUMMARY OF THE INVENTION

Accordingly, it is an object of the present invention to provide an improved regulated high voltage supply.

It is another object of the invention to provide an improved high voltage supply utilizing a plurality of d.c. to d.c. converter modules.

It is still another object of the invention to provide an improved regulated high voltage supply in which control is achieved in a closed loop.

It is an additional object of the present invention to provide a high voltage supply in which improved means are provided for a.c. ripple elimination and for output voltage regulation.

A further object of the invention is to provide a high voltage supply which has improved means for turning the high voltage on and off in accurately timed intervals.

These and other objects of the invention are achieved in a novel high voltage supply having a regulated output voltage. The supply comprises a plurality of modulatable d.c. to d.c. converters, each of which includes a power transformer having a center tapped primary winding and a secondary winding, the center tap being connected to a first d.c. input terminal, a push-pull switching circuit comprising a pair of alternately conducting switching devices, each switching device being connected between a second d.c. input terminal and one end of the primary winding, to produce an alternating voltage in the secondary winding. The secondary winding is connected to an output bridge rectifier to produce the output. The converter output is taken from the positive and negative d.c. output terminals of the rectifier. Each of the "M" converters has a control input to which modulation potentials may be applied to start or stop alternation, and each of the "M" converters produces a first output voltage ($V_M$) corresponding to a coarse output voltage step. The remaining "N" venier converters have a control input to which modulation potentials may be applied and these produce output voltages which are smaller than the outputs of the "M" converters. The "N" converters are used to provide fine output voltage adjustments. Together, the "N" vernier converters provide a total output voltage adjustment range of a "coarse" step ($V_M$).

Means are further provided interconnecting the positive and negative converter output terminals for addition of the rectified d.c. potentials of all M and N converters to produce the high d.c. voltage output. Voltage comparison means are provided having a first analog input proportional to the measured output voltage to produce an error signal indicative of the sign of the difference. Logic means are provided for control of the M and N plurality of vernier converters in response to the error signal. The control logic adjusts the output voltage of the N vernier converters in a direction to reduce the difference. When the limits of the adjustment range of the vernier converters are crossed, a coarse converter is activated, or inactivated to continue the vernier action.

In accordance with another aspect of the invention, the control input of each of the N plurality of vernier converters starts or stops alternation and thereby controls the total vernier converter output. At the same time, the output voltage of the vernier converter is selected to provide a succession of voltage steps subdividing ($V_M$) into smaller, equal parts. Typically, the output voltages of the N vernier units are binary coded ($V_{M/2}$; $V_{M/4}$; $V_{M/8}$; etc.).

In accordance with a further aspect of the invention, the control logic is clocked. The clocking rate is set higher than the ripple frequency so that it may effectively time sample the ripple error. The clocking rate is set at a rate sufficiently high, so that when the vernier voltage steps occur at the clocking rate, a rate of change in the high voltage output is produced which exceeds the maximum slope of the a.c. ripple. When clocking is provided, the logic means is clocked to increment or decrement the number of active converters only at the clocking pulse intervals. To provide a more rapid rate of change in the output voltage at initial start up, the control logic steps the output voltage in coarse voltage steps ($V_M$), or several coarse modules may be activated simultaneously.

In a practical implementation, the control logic comprises a reversible multi-stage counter responsive to the voltage comparison means, each stage of which controls a vernier converter unit. To provide a dead band, the comparison means comprises a pair of comparators to which spaced reference voltages are applied.

In further implementation of the invention, the control logic also includes a shift register having M stages, each of which controls a converter module, and a monitor for responding to the state of the reversible counter. The monitor produces an upward shift in the shift register when the reversible counter fills and steps up to a "0" count and a downward shift when said reversible counter empties and steps down to a full count.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings in which:

FIGS. 3a to 3e are waveforms illustrating the operation of a converter module in reducing a.c. ripple; and FIGS. 4a and 4c are three waveforms illustrating the oscillation transients of individual power modules and their reduction.

DESCRIPTION OF A PREFERRED EMBODIMENT

Figure 1:
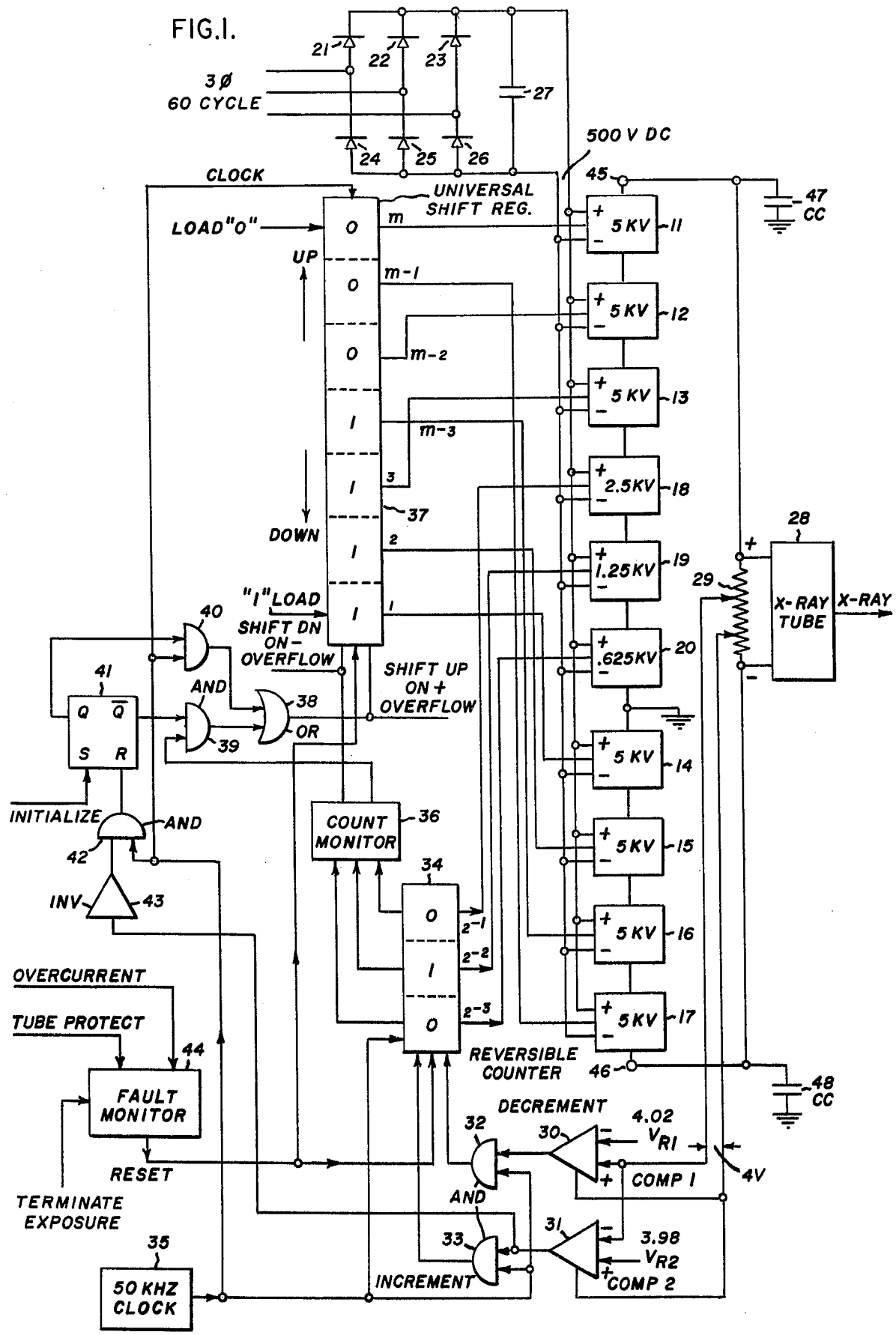
FIG. 1 is a block diagram of a regulated high voltage power supply system for an X-ray tube in which the output voltage represents the sum of the output voltages of a number of d.c. to d.c. comverter modules.

A regulated high voltage supply for X-ray tubes composed of a plurality of similar power modules is shown in FIG. 1. For simplicity, it is shown to comprise seven coarse (5 KV) converter power modules 11 through 17, although a larger number would be customary, and three vernier (2.5; 1.25; 0.625 KV) converter power modules 18, 19 and 20. The output voltage of the modules are summed to produce the regulated high voltage output. The supply is energized from a 500 V maximum d.c. source (21-27) which powers all of the modules. The source comprises rectifiers 21-26 and filter capacitor 27. Filter capacitor 27 is present to reduce the transients caused by module switching. It is not large enough to effectively filter the a.c. ripple from the rectified source except at extremely low load conditions. The control logic for the supply includes the components 29-44 which provide for start and stop operation, active filtering to remove the a.c. ripple on the d.c. source, output voltage regulation and fault monitoring. The X-ray tube to which the high voltage is supplied is shown at 28.

Considering the supply as consisting of a power circuit and a control circuit, the power circuit connections will be considered first. The primary source of power for the high voltage supply is a three phase line of 60 hertz a.c. The a.c. line may be directly connected into the three phase rectifier set 21-26 for rectification of the three phase a.c., or indirectly connected to the rectifier set through a three phase transformer (not shown). The three phase transformer sets the proper d.c. output level and tends to isolate the input lines from switching noise generated in the power supply. The rectification circuit is conventional, with the rectifiers being connected in three series pairs. The first pair (21, 24) is for the first a.c. input line, the second pair (22, 25) is for the second a.c. input line, and the third pair (23, 26) is for the third a.c. input line. The rectified d.c. output is obtained between the paralleled cathodes of rectifiers 21, 22 and 23 at which the positive potential appears, and the paralleled anodes of rectifiers 24, 25 and 26 at which the negative potential appears. The d.c. output waveform, assuming no filtering, has a peak to peak ripple at the 360 hertz per second rate of nominally 13.3% of the peak rectified d.c. voltage. The filter capacitor 27 is coupled across the rectifier output to provide short term current demands at the inverter switching frequency. At light load it may also substantially reduce the 360 hertz ripple. After rectification and filtering, the output of the d.c. source is applied to the power modules 11-20.

The coarse (11 to 17) and the vernier (18 to 20) power modules are interconnected so that their d.c. output voltage is added to obtain the final high voltage output and that output is approximately balanced to ground. On the modules above ground potential, this is done by connecting the negative terminal of the vernier module 20 to ground and its positive output terminal to the negative terminal of the vernier module 19. The positive terminal of the module 19 is connected to the negative terminal of the vernier module 18 and so forth through the coarse modules 13, 12 and 11. The positive high voltage output appearing at high voltage terminal 45 is derived from the positive terminal of the module 11. Similarly, on the modules below ground potential, the positive terminal of the coarse module 14 is connected to ground while its negative terminal is connected to the positive terminal of the module 15. Similarly, module 16 is connected to module 15, and 17 to 16. The negative high voltage terminal 46 of the power supply is coupled to the negative terminal of the module 17. The X-ray tube 28 has its positive terminal connected to the positive high voltage terminal (45) through a cable which has appreciable capacity (47) to ground and the negative terminal of the X-ray tube is connected to the negative terminal 46 through a second cable also having appreciable capacity (48) to ground. When all eight illustrated modules are in operation the output of the supply would be 8 × 5 kilovolts or 40 kilovolts, and it is balanced to ground. If less than the maximum output is desired and certain of the modules are inactive, the imbalance of the supply with respect to ground is adjusted so that it does not exceed the output of one or two coarse modules.

As previously noted, the converter modules have a relatively low voltage (500 volt) d.c. input, and the coarse modules convert it to a higher voltage (5KV) d.c. output. The converter output current levels range from near 0 to 1 ampere. To achieve the high voltage necessary for X-ray applications, a large number of modules are connected in series. While eight modules have been illustrated for simplicity, in a practical case there would be forty modules to produce an output voltage in the range of from 50 KV to 150 KV. This range is suitable for a wide range of medical applications. The 5 KV peak voltage per module at a maximum current of one ampere, corresponds to a 5 kilowatt peak power level per module. The average power per module is reduced by ripple, line voltage drops and load dependent voltage drops. Thus, to assure the maximum programmed output under worst case input conditions, this system requires additional modules of those calculated from the peak voltage. This power level represents a convenient value that may be realized with relatively low cost components. The individual converter modules, which will be described in more detail below, are of a type that may be turned on and off rapidly by means of a logical control. The generated high voltage, required by the X-ray tube, is determined by the number of modules on the "on" state at any time. The ability to turn the modules on and off rapidly permits regulation of the output high voltage in an incremental fashion and dynamic regulation of the ripple resulting from rectification of the 60 cycle power source.

The three vernier modules provide the means to adjust the high voltage output over the full output range in 0.625 KV steps. In the event that greater than 1% accuracy is sought, an additional vernier module may be added to reduce the vernier steps of 0.3125 KV. The control logic is designed to add or subtract a coarse (5KV) step when it is needed to provide the next vernier step and the vernier modules are already activated. Assuming a 13.3% compensation range, as for instance to compensate for ripple, the stepping sequence requires switching the vernier modules and two coarse modules every half ripple wave.

The elements 30-44 in FIG. 1 comprise the control circuit for the individual converter modules. The control functions include starting, fault monitoring, ripple filtering, and output voltage regulation. The portions of the control circuit performing the ripple filtering and output voltage regulation includes the universal shift register 37, the count monitor 36, the reversible counter 34, the comparitors 30, 31 and AND gates 32, 33 and the high voltage sensing voltage divider 29. The control circuit is clocked at 50 KHz by the clock 35, and obtains its "desired" output voltage settings ($V_{R2}$, $V_{R1}$) from an operator controlled voltage source, which is not shown.

The control circuit for performing the ripple filtering and the output voltage regulation operates in a "closed loop". The output voltage is sensed by the voltage divider 29, which has a pair of fixed taps. The taps are placed at points on the voltage divider which reduce the measured voltage to within the range of from 0 to 5 volts. The resistance division allows the measured voltage to remain proportional to the output voltage of terminals 45 and 46. Noting that the high voltage output is approximately balanced to ground, the taps are taken at points in the voltage divider that are nearest to ground potential. The measured output voltage is derived across the taps with neither grounded. One tap is applied to one input of the decrementing comparator 30 and to one input of the incrementing comparator 31. The other tap is connected to the internal ground of the comparators. The operator "programmed" or desired voltage settings ($V_{R1}$, $V_{R2}$) are applied to the other inputs of the two comparators and are also referenced to the internal grounds of the two comparators. The decrementing comparator 30 is designed to produce a logical "1" output (calling for a decrease in output voltage), when the sensed output voltage exceeds 4.02, the first programmed value ($V_{R1}$). The incrementing comparator 31 is designed to produce a logical "1" output (calling for an increase in output voltage) when the sensed output falls below 3.98, which is a second programmed value ($V_{R2}$). The difference in the two programmed values is normally at about 1% of the output voltage. The two values may thus represent a single control setting with an automatic 1% separation.

The outputs of the comparators 30, 31 controlled by the operator settings $V_{R1}$ and $V_{R2}$, control the activation and inactivation of the individual modules in a clocked manner. The output of the comparator 30 is coupled to one input of the AND gate 32 and the output of the comparator 31 is coupled to one input of the AND gate 33. The output of AND gate 32 is coupled to the decrementing input of the reversible counter 34 and the output of AND gate 33 is coupled to the incrementing input of reversible counter 34. The second input of each of the AND gates 32 and 33 is a clocking signal supplied by the 50 KHz clock 35. This connection prevents the application of a comparator signal to the reversible counter 34 except during a clocking interval. The counter 34 has three stages corresponding to the number of vernier modules, and stores a count corresponding to a 3 digit binary number. The stored count appears as a logical "0" or a logical "1". The logical "0" is normally represented by a zero voltage output and the logical "1" by a positive voltage of a few volts. The most significant bit stored in the counter is applied to the 2.5 KV vernier converter module 18. The second most significant bit is applied to the 1.25 KV vernier converter module 19, and the third most significant bit is coupled to the 0.625 vernier counter module 20. A separate reclocking connection from the reversible counter 34 to clock 35 is also provided.

The foregoing logic (including elements 30, 31, 32, 33 and the reversible counter 34) directly controls the vernier converter modules (18, 19, 20). When a "1" appears in a stage of the reversible counter 39, oscillation within the vernier converter module that is coupled to that stage is initiated. The mechanism in each converter module which responds to this mode of logic control is a "modulator" which starts or stops oscillation of the switching devices in the module. When oscillation starts in a module, a d.c. output is produced. When it stops, the d.c. output is discontinued. Thus, the logical state of the three stage reversible counter 34 controls the d.c. output of each of the three vernier converter modules 18, 19, 20 and their sum.

The coarse converter modules (11-17) are indirectly controlled by the same elements through a counter monitor 36 and the universal shift register 37. The shift register 37 has one stage for each of the coarse modules and since the coarse modules are all of equal value, the position of the stages on the register are of no place significance. However, the connections are ordered to retain an approximate balance with respect to ground in the output voltage as it is stepped. For this reason, the last ($m$th) stage in the universal shift register 37 is used to control the most positive coarse module 11 and the next to last ($m$-1) stage is used to control the most negative coarse module 17. Continuing down the sequence, the second from last stage ($m$-2) is used to control the next most positive module 12 and the third from last ($m$-3) is used to control the next most negative module 16. In the same succession, stages 3, 2, 1 are used to control the modules 13, 15 and 14.

In normal (running) operation, the shift register 37 is stepped up or down by signals derived from the count monitor 36. For this purpose, the shift register 37 has a separate incrementing input, a separate decrementing input and a clocking input to the 50 KHz clock 35. The count monitor 36 has three inputs coupled to the logical outputs of the reversible counter 34. The count monitor (36) produces one logical "1" at its first output when the inputs from the reversible counter proceeds from a full count (111) to empty (000) and one logical "1" at its other output when the reversible counter proceeds from empty (000) to a full count (111). The first output of the count monitor is coupled indirectly (in a manner to be explained hereinafter) to the incrementing input of the shift register 37, and the second output of the count monitor 36 is coupled directly to the decrementing input of the shift register 37. Thus, when the reversible counter 34 is full, the count monitor produces a signal at its first output on the next increasing count which empties the reversible counter. The first output signal causes the universal shift register 37 to add an additional stage to a logical "1" state. By virtue of the control of the universal shift register 37 over the coarse modules, an additional coarse module is activated. However, since all vernier modules are turned off on that count, the change in output potential is increased one vernier increment (0.625 KV). Conversely, when the reversible counter indicates a "0", upon the next decreasing count which fills (111) the reversible counter, a signal is produced at the second output of the count monitor which causes the universal shift register 37 to subtract a stage from the logical "1" state. This inactivates an associated coarse converter module at the same time that all the vernier modules are turned on. Thus, the output potential is reduced one vernier decrement.

The foregoing mechanism for achieving vernier stepping of the output potential can occur at a rapid rate. The rapidity of the rate is adequate for both a prescribed degree of ripple filtering and for output voltage regulation. The ripple output, assuming a three phase 60 cycle input, produces a ripple at 360 hertz as illustrated in the FIG. 3(a). The calculated percentage of voltage ripple, neglecting the filtering effect of capacity 27, is 13.3%. FIG. 3(b) illustrates a half cycle of the same ripple function with the time scale expanded 10 times but with the amplitude scale unmodified. The dotted line of FIG. 3(c) illustrates the unregulated ripple in the HV output for approximately 1/72 of a cycle of the input a.c. and the solid line of FIG. 3(c) illustrates the corresponding regulated HV output waveform. The time scale of FIG. 3(c) is expanded approximately 12 times over that of FIG. 3(b), and the vertical scale is expanded approximately 5 times.

FIG. 3(d) illustrates the clocking pulses on the same time scale as FIG. 3(c) and FIG. 3(e) illustrates the total number of active modules plotted over the same time scale as FIGS. 3(c) and 3(d).

The plot in FIG. 3(c) of the regulated and unregulated HV output waveform is shown for the period $T_3$. The period $T_3$ corresponds to 1/72 of the period $T_1$, which in turn is 1/16 of the period of the primary a.c. source. Assuming a 60 hertz source, $T_1$ is 2780 microseconds, $T_2$ is 1667 milliseconds and $T_3$ is approximately 16.67/72 or 232 microseconds. The unregulated HV output in FIG. 3(c) is thus sampled at closely spaced intervals within a ripple cycle at the clocking pulse rate. In FIG. 3(d), eight clocking pulses are shown, each occurring at a timing interval ($T_4$) of about 20–23 microseconds per pulse. The unregulated dotted curve of FIG. 3(c) increases 3–5% during the illustrated sampling period, increasing smoothly to the maximum of 13.3% of the peak d.c. output. The regulated curve of FIG. 3(c) constitutes a succession of unevenly spaced sawtooth-like notches at a lower amplitude, (typically, about 1% of the peak d.c. output). The spacing of the notches is at integral clocking intervals. The regulated output may be regarded as having a constant d.c. voltage upon which an a.c. component of greatly reduced amplitude and greatly increased frequency content is superimposed. The amplitude variation is reduced to 1% in the illustration, indicating an improvement by a factor of 13. The a.c. or high frequency "noise" component occurs over a broad spectrum with little energy below 10 kilohertz. Transformed to this higher frequency domain, any further filtering is greatly simplified in that less massive capacitors and inductors than would be required for 60–360 hertz filters can be used. With the power modulus illustrated, the filtering takes place from the leakage inductances of the secondaries of the output transformers, augmented by small capacitors, typically of 100 picofarads, placed across the output of each power module.

FIG. 3(d) illustrates the stepping of the individual modules. While the FIG. 3(d) drawing does not depict the waveform at an interval in which a coarse module comes on, the actual stepping during idling current compensation is always in vernier increments as previously indicated.

The foregoing operation for ripple correction is also applicable to the correction of slower frequency drift in the output voltage as the load changes or the voltage on the power line changes. A faster incrementing process is used for operator controlled start up. The start up takes place with the modules, whose design will shortly be described, already in a stand-by condition, and it entails a stepwise increase in the output voltage. In start up, as contrasted to ripple correction, the stepping is in coarse increments at the clock frequency. The start up logic includes the additional elements 38 through 43.

The start up process is initiated by a logical "1" pulse coupled to the Set input of the flip-flop 41. The initial signal is normally produced by a manually operated push button (not illustrated). The flip-flop has a second, "Reset" input and produces an output at each of two complementary outputs (Q and $\overline{Q}$). The operator induced signal produces a logical "1" at the Q output of the flip-flop, which output is coupled to one input of the AND gate 40. The other input of the AND gate 40 is coupled to the 50 KHz clock. When the clocking pulse occurs, the AND condition is satisfied, and the AND gate 40 produces a logical "1" at its output. This output is coupled to one input of the OR gate 39. The OR gate then produces a logical "1" at its output, irrespective of the condition at its other input, and the OR gate output is coupled to the increment or "shift up" counting input of the universal shift register 37. The shift register is thus caused to go to a [0000001] state and the first coarse module (14) is turned on. On the next clocking pulse, the shift register goes to the [0000011] state and a second coarse module is turned on.

The coarse modules are then successively turned on at the clocking pulse rate until the HV voltage sensing circuit indicates that the preset output voltage has been achieved and the coarse stepping stops. At the point that the summed output voltage exceeds the threshold of the incrementing comparator 31, a logical "0" output is produced. The logical "0" output from 31 is coupled to the inverter 43 which produces a logical "1" output and couples it to one input of the AND gate 42. The other input of AND gate 42 is coupled to the clock 35. Thus, at the next clocking interval, the AND input condition is met, and a logical "1" pulse is coupled from 42 to the Reset input of the flip-flop 41. This causes the Q output to revert to a logical "0" state, causing the output of AND gate 40 to go to a "0" state. Assuming no other signal is present at the input of "OR" gate 38, the coarse incrementing is discontinued. The turn on process is thus rapid, occurring in from 300 to 900 microseconds, assuming 10 to 30 modules is accurately reproducible, and as will be explained, occurs at a metered rate which prevents large starting transients.

The count monitor 36 exerts its control indirectly through the AND gate 39 and OR gate 38 on the incrementing or upward shift input of the universal shift register 37 as suggested earlier. This may now be explained. The AND gate 39 has one input coupled to the first output of the count monitor and a second input coupled to the complementary output of the flip-flop 41. After the starting sequence has been completed, a logical "1" appears at the $\overline{Q}$ output of the flip-flop. AND gate 39, AND's that with the next logical "1" from the count monitor 36 to produce a logical "1" output. The AND gate output is coupled through the OR gate 38 to the upward shift input of the universal shift register. Here it causes an upward shift in the register 37 as signaled by the count monitor 36 in the same manner as if the connection between the two was direct.

The final element in the control logic of the power supply is the fault monitor 44 arranged to trip out the supplies when over-current or several other conditions occur. This operates upon the power modules through a separate reset signal coupled to the reset inputs of the reversible counter 34 and of the universal shift register 37. When the fault signal occurs, all stages of both registers revert to a logical "0" output condition, and all power modules are returned to a stand-by condition in which no high voltage d.c. output is produced.

Figure 2:
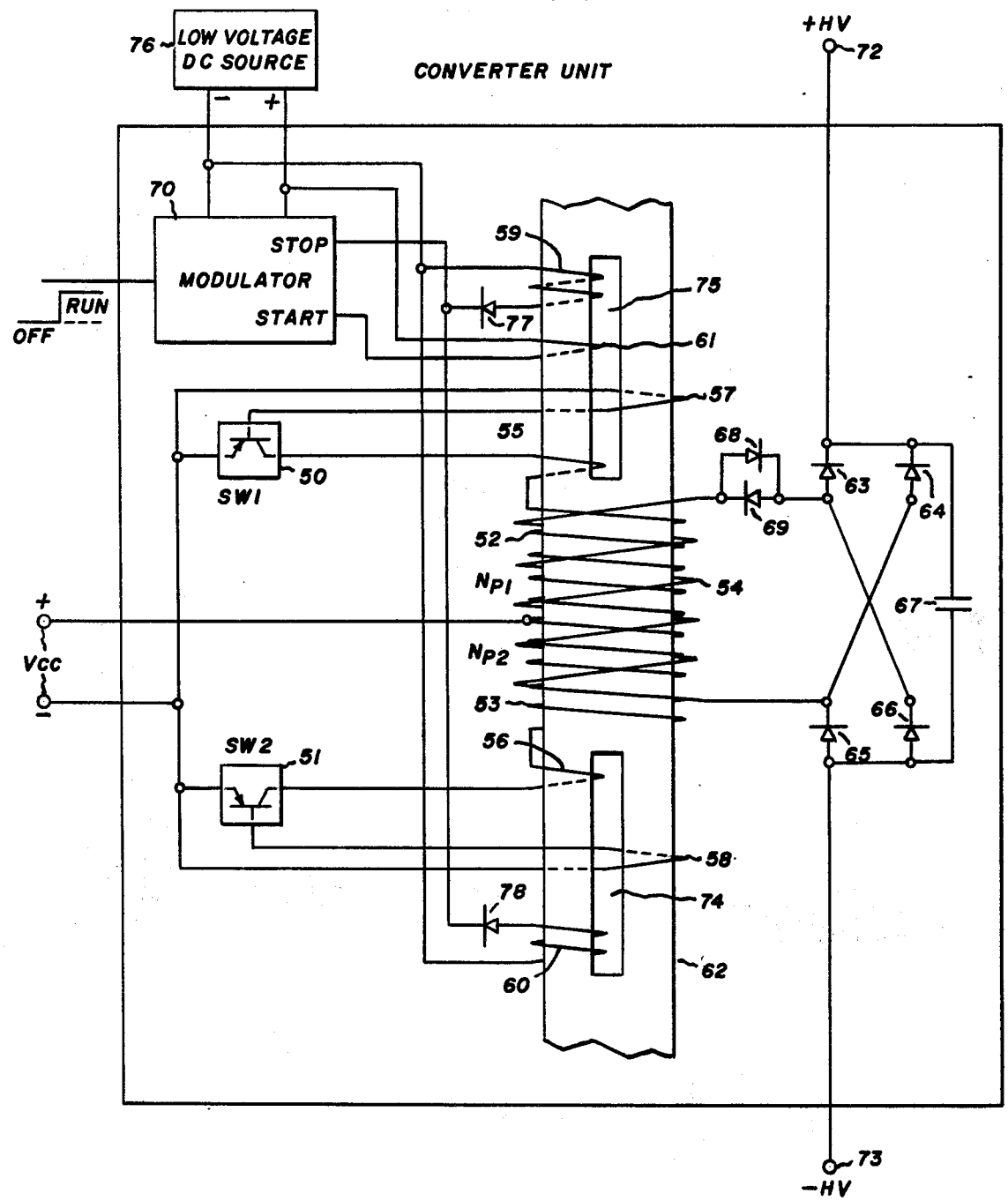
FIG. 2 is a simplified diagram of an individual converter module suitable for serial connection in the power supply system of FIG. 1.

A power module which is suitable for the described mode of operation is illustrated in FIG. 2. A particular module is described in greater detail in U.S. Pat. No. 3,914,680 of Joseph P. Hesler and Samuel M. Korzekwa entitled "Static Inverter". Other suitable power modules are described in U.S. Pat. No. 4,002,999, entitled "Static Inverter". These modules are all characterized by an ability to turn on quickly, and to be turned off in a fraction of a converter cycle.

The power module depicted in FIG. 3 has input terminals 71 for connection to a d.c. source of moderate potentials (typically, 500 volts), and polarized output terminals 72, 73 for derivation of a higher voltage d.c. output (typically, 5 kilovolts). The module consists of a first electronic switch 50, a second electronic switch 51, and a power transformer having primary windings 52, 53, secondary winding 54, and control windings 55-61, all associated with a double apertured core 62. The primary (52, 53) and secondary (54) windings all encircle the full core, which is formed into a closed magnetic path, while the control windings 55-61 are associated with only a branch of the core — and pass through an aperture (74 or 75) for that purpose. A rectifier bridge is provided comprising rectifiers 63-66, a filter capacitor 67 for transient elimination and a reversely connected diode pair 68,69 designed to prevent low voltage circulating currents in the secondary. The power module is provided with a modulator 70 for initiating and terminating active operation of the module.

The illustrated module functions as a free-running push-pull oscillator in which d.c. energy is converted to a.c., transformed to a higher a.c. voltage in the transformer, and then rectified at the higher voltage d.c. The oscillator consists of the two switches 50 and 51, which are normally high power transistors, single or paired. The regenerative drive and cross coupling action for free running push-pull operation is provided by the control windings. In particular, assuming SW1 (50) is running and beginning to conduct, control winding 55 in series with primary winding 52, steers the flux into the left branch causing that branch to saturate first. This causes winding 57, which separately encircles the left branch, and the right branch, as a result of a flux increase in the left hand branch, to apply a conduction increasing feedback signal to the base of the switch 50. This causes the switch 50 to turn on sharply with a steep wavefront. Later in the conduction period of switch 50, the left branch becomes saturated, removing the regeneration on the left part of winding 57. The right part of winding 57 now receives an inductive surge. This surge is poled to apply a conduction terminating signal to the base of the first switch. The alternate switch 51 operates in a similar manner, coming on when switch 50 turns off under the influence of the two part, base connected winding 58.

The switching just described channels current from the main d.c. source, through the respective primaries (52, 53) of the power transformer, and through the respective switching devices (50, 51) to the negative terminal of the d.c. input source. The alternating conductivity of the switches (50, 51) causes an alternating flux in the main core of 62, and produces an alternating flux in secondary power winding 54. The alternating secondary voltage is coupled to the a.c. input of the rectifier bridge (63-66) and is rectified. The rectified positive high voltage appears at the cathodes of rectifiers 63, 64 which are coupled to positive module output terminal 72. The rectified negative high voltage appears at the cathodes of rectifiers 65, 66, which are coupled to the negative module output terminal 73.

The foregoing converter module may be arranged to operate efficiently at a frequency on the order of 10 KC, although higher and lower frequencies are quite practical. Oscillations are started by the modulator 70 and stopped in a fraction of a converter cycle by control signals applied to the start and stop windings. The start output of modulator 70 is coupled to the start winding 61 encircling the left branch at aperture 75. When the modulator 70 receives a signal to start active module operation, a conductive path is produced between the start modulator terminal and ground. Conduction within 70 allows current to flow from the positive terminal of the low voltage d.c. source 76 into start winding 61, and thence through the modulator to the negative terminal of source 76. Current flow in winding 61 induces a regenerative base current in winding 57 which initiates the turning on of switch 50. Since a single start winding is provided, the start operation always starts with switch 50.

When operation is underway, either switch (50 or 51) may be turned off in a small part of a conduction period. For this purpose stop windings 59 and 60 are provided encircling the left hand leg at each aperture (74 and 75). Assuming a stop signal on the modulator 70, an internal conductive connection is made from the negative terminal of source 76 to the stop terminal. This allows current to flow in either stop winding 59, 60 in the sense of the diodes (77-78). The currents force the main power flux into the right hand branches of the core precluding further conduction inducing (regenerative) base drive. The flux change in the right hand branch produces a degenerative pulse in winding (57 or 58) which turns off the active switch (50 or 51).

The switching operation of a module which has just been described is illustrated in FIGS. 4(a), 4(b) and 4(c). The a.c. waveform of a module is a frequency of about 10 KHz and is a modified square wave of alternating polarity, as shown in FIG. 4(a). After rectification, the output waveform of a module is as shown at 4(b). The waveform of an individual module showing the oscillation transients but taking into account the stray and intentional filtering, is as shown in FIG. 4(c). The ripple which is at twice the switching frequency of 10 KHz, represents a small percentage of the d.c. output of the module. When the modules are connected into the system, the oscillation transients are filtered by the leakage inductances in the series string of transformer secondaries, by the recurrent capacitances at the outputs of the individual modules, and by the distributed capacitance of the high voltage output cables.

The randomness of the individual inverter output frequencies and phases results in a statistical summation of ripple components from each inverter. The randomness reduces the combined output ripple from that which would result from synchronously switched inverters.

The switching rate of the converter modules is typically near 10 kilohertz. At a hypothetical switching rate of 1 KHz there is already some beneficial reduction in transformer core material and in the size of filter capacitors required over that of a converter operating at a 60 hertz switching rate. The 1000 hertz switching rate would normally produce an annoying sound output at the second harmonic of the switching rate. The continuing improvement in material savings dictates a practical lower limit of about 7.5 kilohertz for the switching rate and selection of this switching rate sets the second harmonic at 15 kilohertz, near the upper limits of audibility and thus tolerable. As the switching rate increases above 7.5 kilohertz, two other factors become important. They are the storage times in the switching devices and leakage reactance in the transformers. If cost is unimportant, higher frequency transistors can be used which have storage times permitting switching rates above 100 kilohertz. Customary lower cost power transistors are capable of effective operation at frequencies up to 50 kilohertz, but produce measurable losses starting from about 15 to 20 kilohertz. In high voltage supplies in which a voltage is stepped up and a high degree of isolation is needed between primary and secondary windings, the effect of leakage reactance also becomes important at about 15 to 20 kilohertz. The foregoing figure corresponds to a transformer configuration in which a 50 to 75 kilovolt voltage difference exists between the primary and secondary winding. Thus, practical constraints narrow the useful range of modular switching rates to from 7 ½ kilohertz to 20 kilohertz in high voltage supplies such as the X-ray power supply herein disclosed.

The module illustrated in FIG. 2 produces an a.c. voltage in the secondary windings of a power transformer, and this voltage is applied to a 4 rectifier bridge. The modules are interconnected by connecting the positive bridge terminal of one module to the negative bridge terminal of the next module. This mode of serial connection sums the d.c. output voltage of each module at the ends of the serial string. In particular, the output voltage of an active module is added to that of any other active module. It also permits a module to become inactive and yet remain in the circuit without adversely affecting the voltage output of the other modules. An output configuration using a full wave rectifier would also permit this kind of serial module interconnection, but it requires additional secondary windings and is normally less desirable than the bridge.

The vernier modules herein described represent a satisfactory way to introduce an accurate correction to the output voltage in a modular system wherein stepping the basic modules produces too coarse a correction. As discussed, this dynamic correction can be used to reduce ripple voltages at the line rate (50–60 hertz) or at some harmonic thereof and in magnitudes as high as 13.3% of the peak rectified output. The vernier modules may take the binary weight form herein described wherein each module is of different voltage output, or may consist of several modules of equal voltage output. In both cases the total voltage of all the vernier units should equal the value of a coarse module, less the vernier stepping increment.

One may also use a pair of vernier modules whose output voltage is controlled in an analog fashion. A pair of modules is preferable, since 100% modulation of the output of a module is very difficult. Thus, with two analog vernier modules, each module is adjusted to produce a range of adjustment of one-half the voltage of a coarse module (5KV to 2.5 KV), and each is made capable of providing up to 1 ampere of output current. If it is desired to use only standardized 5KV modules, the two vernier modules may each consist of a standard 5KV module, with an intervening switching regulator inserted between the module and the d.c. supply. A suitable switching regulator produces a variable d.c. voltage by use of an electronic switch having a variable duty cycle. The electronic switch meters variable amounts of current to an energy storage capacitor. The output voltage in such regulators is readily adjusted over the 50% range required to give adjustibility between 500 and 250 volts d.c. With a 50% range of variation in the input d.c. supply, a single coarse module produces a corresponding 50% variation in output voltage, i.e., 2.5 KV to 5 KV, and two coarse modules produce the 5 KV range, necessary to achieve continuous adjustment of the output high voltage.

The logic for the control of two vernier analog modules is of the same general nature as that shown in FIG. 1. The measured high voltage output voltage is compared to a desired setting to obtain a control voltage. The control voltage is used to control the output voltage of two analog vernier modules, which are preferably controlled together. When a minimum voltage of 5 KV for the two modules is reached, and an increase is still called for, the second sensor at the output of the two vernier modules turns on a coarse module via the universal shift register named above. The function of the second sensor is analogous to that of the count monitor 36 in FIG. 1. When a coarse module is added, the control logic automatically shifts the vernier modules back to their low voltage limits, and when a coarse module is substracted, the vernier analog modules are automatically switched to their upper voltage limits. After the switching instant, the high voltage output sensor takes over and resumes control of the vernier analog modules.

The arrangement described in FIG. 1 uses the same feedback network to compensate for a.c. ripple and to provide output voltage regulation against changes in load or supply line variations. One may separate the two functions by controlling the vernier modules in a programmed manner to eliminate ripple, while using a narrow band long time constant output sensing circuit for regulating the output voltage to compensate for line and load variations.

The feedback regulation scheme operates with a minor reduction in effectiveness when and if a failure occurs in any module in the string. Normally, several extra modules may be added to the system to serve as spares to provide full range regulation capability in the event that any modules do fail. (Normally, a failure means only that it can not be activated, however, it does not prevent the rest of the system from operating satisfactorily.)

Because the high voltage d.c. supply is modularized, this bulk may be arranged in serveral flexible physical dispositions, depending upon the application. Because of the exclusive use of higher operating frequencies, the spatial needs of the present supply are reduced to half those of conventional monolithic supplies, and the weight is reduced by a factor of about four.

What we claim as new and desire to secure by Letters Patent of the United States is:

1. A high voltage supply having a regulated output voltage comprising:
   a. a plurality of modulatable d.c. to d.c. converters,
      1. each converter having
         i. input terminals for connection to a d.c. power source,
         ii. a power transformer having a center tapped primary winding, the center tap being connected to one of said d.c. input terminals, and a secondary winding,
         iii. a push-pull switching circuit comprising a pair of alternately conducting switching devices, each switching device being connected between the other input terminal of said d.c. source and one end of said primary winding to produce an alternating voltage in said secondary winding during alternation which falls to zero when alternation stops,
         iv. a rectifier bridge having a.c. input terminals to which said secondary winding is connected, and a pair of respectively positive and negative d.c. output terminals from which the rectified inverter output is taken,
      2. i. each of "M" converters of said plurality having a control input to which modulation potentials may be applied to start or stop said alternation, and producing a first output voltage ($V_M$) for providing a coarse output voltage step and the remaining
         ii. "N" vernier converters of said plurality having a control input to which modulation potentials may be applied and producing a second output voltage which is variable for providing a fine output voltage adjustment, said "N" converters providing a total output voltage adjustment range at least approximately equal to ($V_M$),
      3. means interconnecting said positive and negative converter output terminals for addition of the rectified d.c. potentials of all M and N converters to produce a high d.c. voltage output,
   b. voltage comparison means having a first analog input proportional to the measured output voltage to produce an error signal indicative of the sign of the difference, and
   c. logic means coupled to said voltage comparison means for response to said error signal and coupled to said control inputs of said "M" and "N" plurality of vernier converters for control thereof, said control adjusting the output voltage of said "N" vernier converters in a direction to reduce said difference, and when the upper limit of said adjustment range of said "N" vernier converters is crossed, activating an "M" coarse converter, and when the lower limit is crossed, inactivating an "M" coarse converter.

2. The high voltage supply set forth in claim 1 wherein
the control input of each of said "N" plurality of vernier converters starts or stops alternation therein, and wherein
the output voltage of each converter of said "N" plurality is selected to provide a succession of voltage steps in said second output voltage to subdivide a coarse voltage step ($V_M$) into smaller, equal parts when the active vernier converters are incremented or decremented.

3. The combination set forth in claim 2 wherein the output voltage of said N vernier units is binary coded:

$$V_1 = \frac{V_M}{2}$$

$$V_2 = \frac{V_M}{4}$$

. .
. .
. .

$$V_N = \frac{V_M}{2^N}$$

where the subscripts denote the rank of the vernier unit in descending position.

4. The combination set forth in claim 3 wherein:
   1. said d.c. input source is a rectified low frequency a.c. source, subject to an a.c. ripple voltage having a predetermined maximum slope and wherein
   2. a clocking pulse is provided having a pulse repetition rate, which is higher than the frequency of said ripple for sampling the comparator error signal to determine the sign of the required vernier correction, said vernier voltage steps in the clocking rate equalling or exceeding said maximum slope.

5. The combination set forth in claim 4 wherein said logic means is clocked by a clocking pulse to increment or decrement the number of active converters at the clocking pulse intervals.

6. The combination set forth in claim 5 wherein the stepping is in coarse voltage steps ($V_M$) during initial start up and in vernier voltage steps ($V_N$) during running operation.

7. The combination set forth in claim 5 wherein said logic means comprises a reversible multi-stage counter responsive to said voltage comparison means, and increments or decrements the sum of the vernier converter outputs by an additional vernier converter unit in accordance with the sign of the error.

8. The combination set forth in claim 5 wherein said comparison means comprises:
   a. a first and a second comparator for separately controlling the incremental and decremental stepping, said "actual" high d.c. voltage output being applied to one input of both of said comparators, and
   b. thresholding means for setting the threshold at which stepping occurs, including a first reference voltage applied to the other input terminal of the decrementing comparator which is set higher than the desired output voltage by an amount $\Delta V/2$, and a second reference voltage applied to the other input terminal of the incrementing comparator, which is set lower than the desired output voltage by an amount $\Delta V/2$.

9. The combination set forth in claim 7 wherein said logic means further comprises:
   a. a shift register having M stages for control of each of said M plurality of coarse converters, and
   b. means for monitoring the state of said reversible counter to produce an upward shift in said shift register when said reversible counter fills and goes to a "0" count and a downward shift when said reversible counter empties and goes to a full count.

10. The combination set forth in claim 5 wherein the alternation and clocking frequencies are set substantially higher than the frequency of the a.c. ripple in the d.c. input supply to reduce energy storage requirements to achieve a given degree of output filtering.

* * * * *